United States Patent
Yavonditte et al.

(10) Patent No.: US 11,410,202 B2
(45) Date of Patent: *Aug. 9, 2022

(54) METHOD FOR QUANTIFYING ADVERTISING IMPRESSIONS

(71) Applicant: Yieldmo, Inc., New York, NY (US)

(72) Inventors: Michael Yavonditte, New York, NY (US); David Sebag, New York, NY (US); Indu Narayan, New York, NY (US); Rahul Rao, New York, NY (US); Elber Carneiro, New York, NY (US); Nook Harquail, New York, NY (US); David Cohen, New York, NY (US)

(73) Assignee: Yieldmo, Inc., Nashua, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/033,540

(22) Filed: Sep. 25, 2020

(65) Prior Publication Data
US 2021/0012387 A1 Jan. 14, 2021

Related U.S. Application Data

(63) Continuation of application No. 16/119,819, filed on Aug. 31, 2018, now Pat. No. 10,922,724.
(Continued)

(51) Int. Cl.
G06Q 30/02 (2012.01)
(52) U.S. Cl.
CPC ..... *G06Q 30/0272* (2013.01); *G06Q 30/0242* (2013.01)
(58) Field of Classification Search
None
See application file for complete search history.

(56) References Cited

U.S. PATENT DOCUMENTS

| | | | | |
|---|---|---|---|---|
| 2002/0087403 A1* | 7/2002 | Meyers | .............. | H04N 21/4542 705/14.64 |
| 2008/0249832 A1* | 10/2008 | Richardson | ........ | G06Q 30/0247 705/14.46 |

(Continued)

OTHER PUBLICATIONS

Zhang et al., "An Empirical Study on Display Ad Impression Viewability Measurements", UCL Technical Report. May 20, 2015, London, UK, arXiv:1505.05788v1 [cs.HC] May 21, 2015. (Year: 2015).*

*Primary Examiner* — Christopher B Tokarczyk
(74) *Attorney, Agent, or Firm* — Run8 Patent Group, LLC; Peter Miller; Leah Raddatz

(57) ABSTRACT

One variation of a method for quantifying user engagement includes: serving a digital advertisement to a mobile device; recording a first proportion of pixels of the digital advertisement rendered on a display of the mobile device during a first sampling period; recording a second proportion of pixels of the digital advertisement rendered on the display of the mobile device during a second sampling period offset in time from the first sampling period; calculating a cumulative pixel exposure of the digital advertisement at the mobile device based on a combination of a first product of the first proportion of pixels and a duration of the first sampling period and a second product of the second proportion of pixels and a duration of the second sampling period; and storing the cumulative pixel exposure as an engagement metric for a user consuming the digital advertisement at the mobile device.

20 Claims, 5 Drawing Sheets

Related U.S. Application Data

(60) Provisional application No. 62/694,419, filed on Jul. 5, 2018, provisional application No. 62/678,194, filed on May 30, 2018, provisional application No. 62/552,901, filed on Aug. 31, 2017.

(56) References Cited

U.S. PATENT DOCUMENTS

| | | | |
|---|---|---|---|
| 2011/0082755 A1* | 4/2011 | Itzhak | G06Q 30/0273 705/14.69 |
| 2012/0054143 A1* | 3/2012 | Doig | G06Q 30/0269 706/47 |
| 2015/0235275 A1* | 8/2015 | Shah | G06Q 30/0269 705/14.66 |

* cited by examiner

METHOD FOR QUANTIFYING ADVERTISING IMPRESSIONS

CROSS-REFERENCE TO RELATED APPLICATIONS

This application is a continuation of U.S. patent application Ser. No. 16/119,819, filed on 31 Aug. 2018, which claims the benefit of U.S. Provisional Patent Applications Nos. 62/552,901, filed on 31 Aug. 2017, 62/678,194, filed on 30 May 2018, and 62/694,419, filed on 5 Jul. 2018, all of which are incorporated in their entireties by this reference.

TECHNICAL FIELD

This invention relates generally to the field of mobile advertising and more specifically to a new and useful method for quantifying advertising impressions in the field of mobile advertising.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Method

Figure 1:
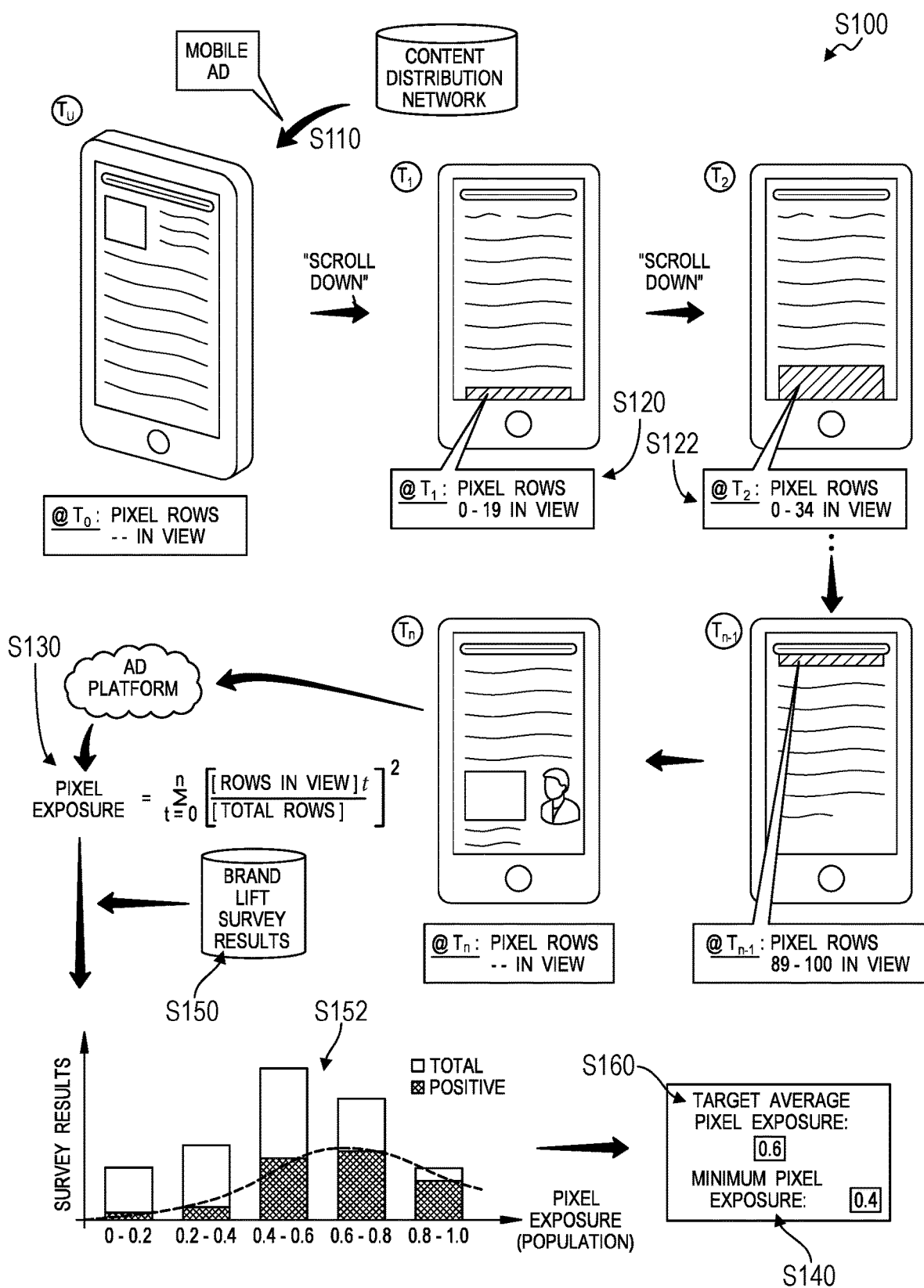
FIG. 1 is a flowchart representation of a method.
Figure 2:
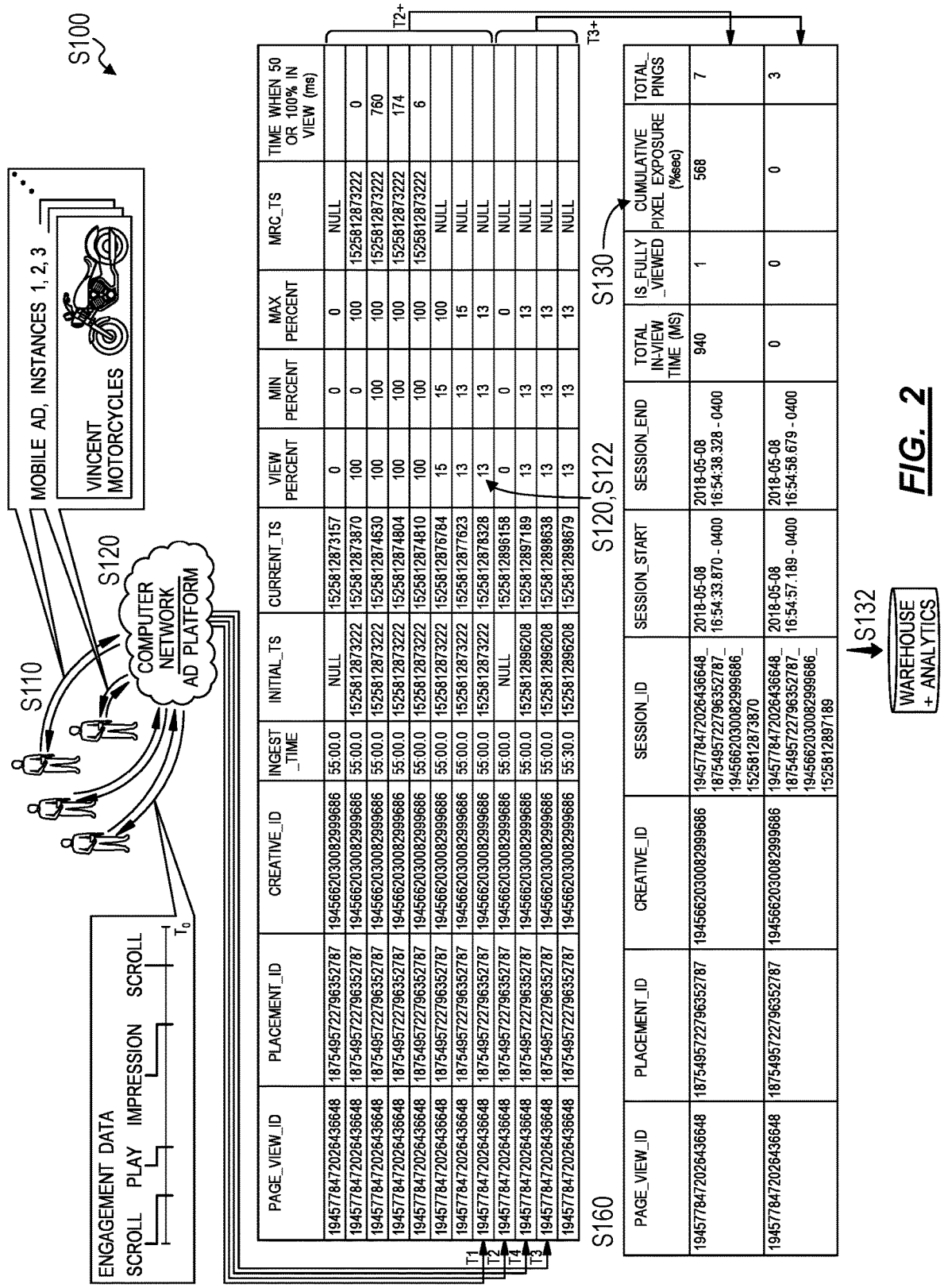
FIG. 2 is a flowchart representation of one variation of the method.

As shown in FIGS. 1 and 2, a method S100 for quantifying user engagement includes: at a first time, serving a digital advertisement to a mobile computing device in Block S110; recording a first proportion of pixels of the digital advertisement rendered on a display of the mobile computing device during a first sampling period in Block S120; recording a second proportion of pixels of the digital advertisement rendered on the display of the mobile computing device during a second sampling period offset in time from the first sampling period in Block S122; calculating a cumulative pixel exposure of the digital advertisement at the mobile computing device in Block S130 based on a combination of a first product of the first proportion of pixels and a duration of the first sampling period and a second product of the second proportion of pixels and a duration of the second sampling period; and storing the cumulative pixel exposure as an engagement metric for a user consuming the digital advertisement at the mobile computing device in Block S132.

One variation of the method S100 includes: at a first time, serving a digital advertisement to a mobile computing device in Block S110; recording a first duration of time that a first set of pixels in the digital advertisement are rendered within a viewport on the mobile computing device during an ad session in Block S120; recording a second duration of time that a second set of pixels in the digital advertisement are rendered within the viewport on the mobile computing device during the ad session in Block S122; calculating a cumulative pixel exposure of the digital advertisement for the ad session in Block S130 based on a combination of a first product of the first duration of time and a first proportion of the digital advertisement corresponding to the first set of pixels and a second product of the second duration of time and a second proportion of the digital advertisement corresponding to the second set of pixels; and storing the cumulative pixel exposure as an engagement metric for a user consuming the digital advertisement at the mobile computing device in Block S132.

Figure 4A:
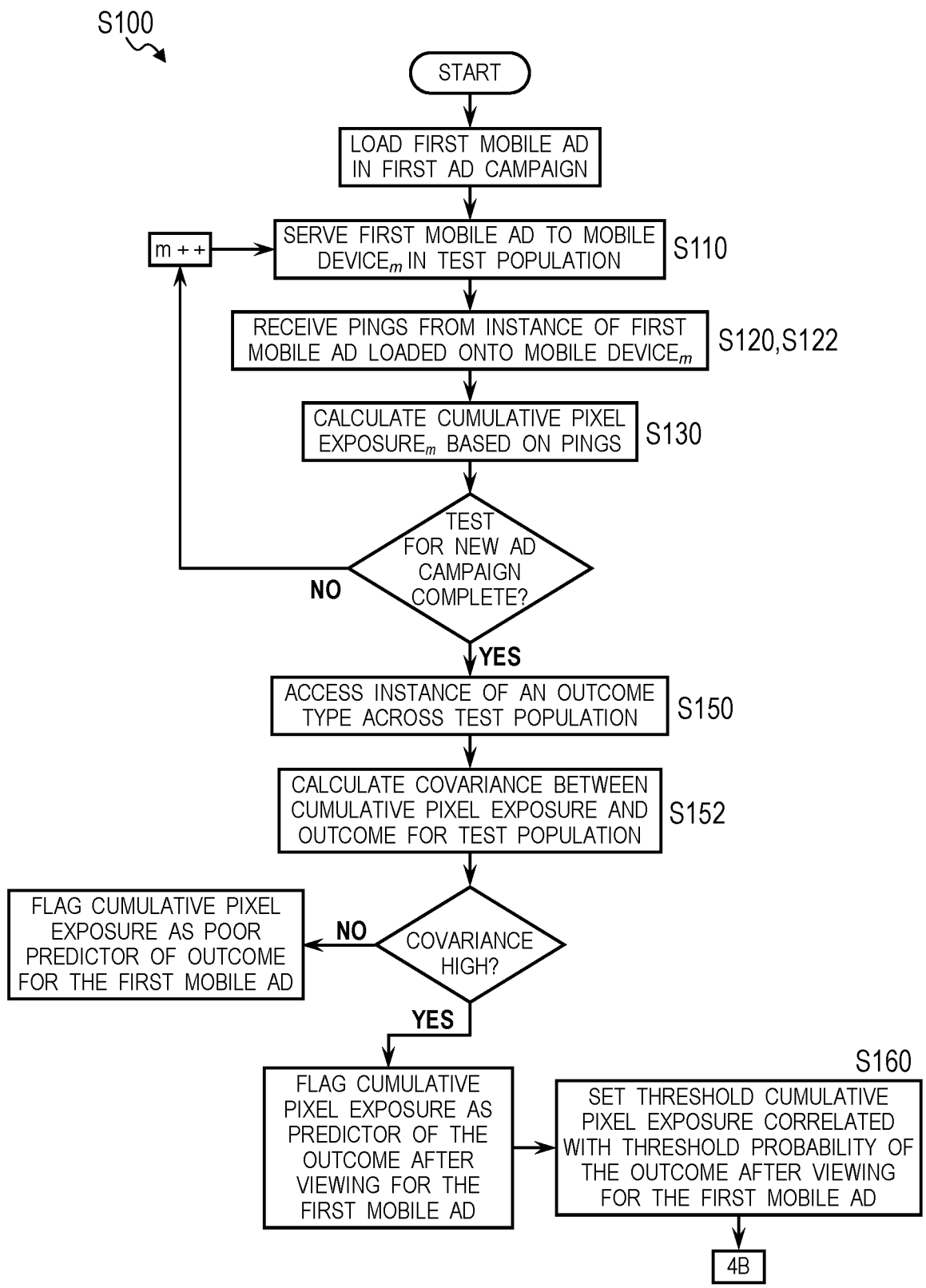
FIGS. 4A and 4B are flowchart representations of one variation of the method.
Figure 4B:
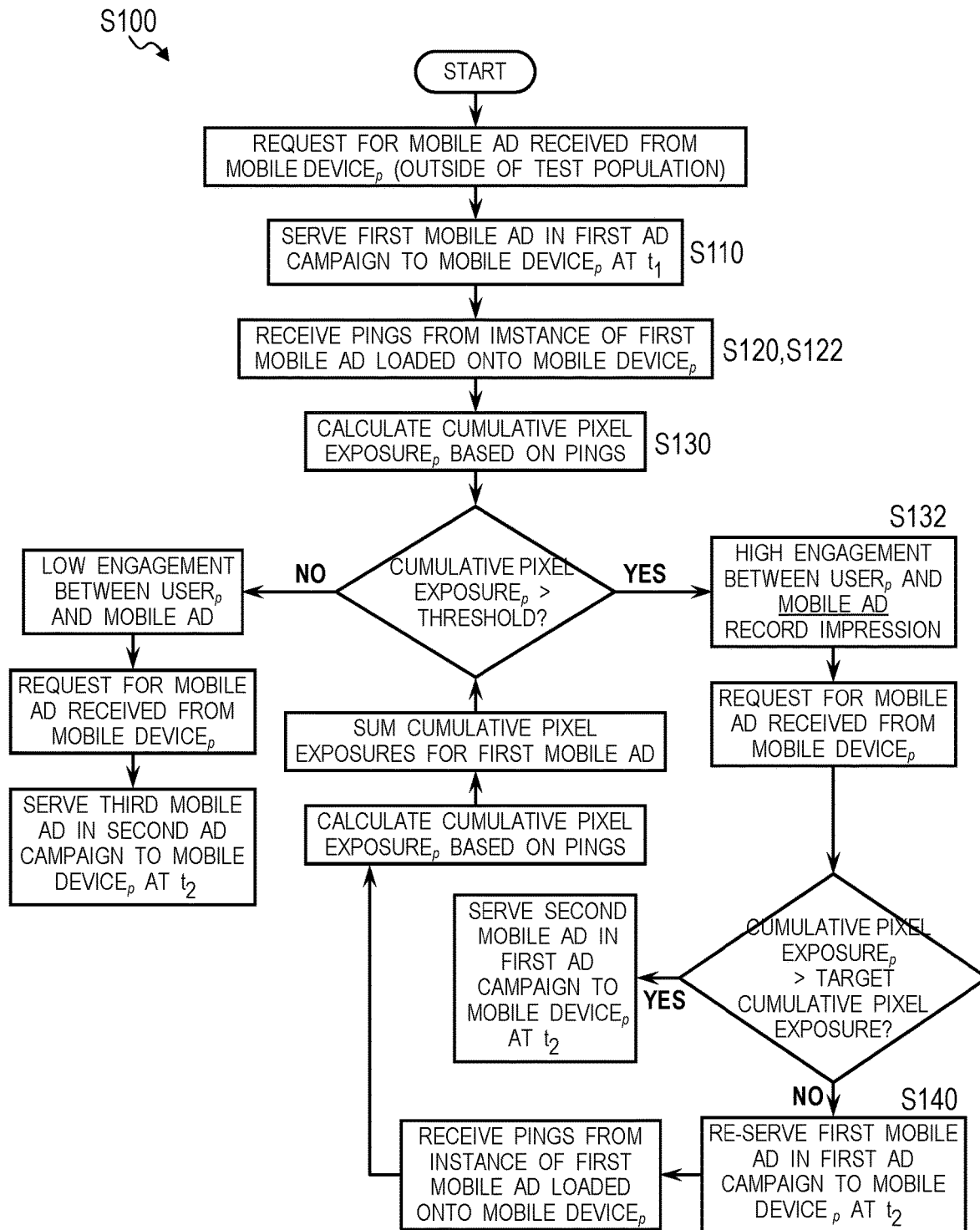

Another variation of the method S100 shown in FIGS. 1 and 4B includes: at a first time, serving a digital advertisement to a mobile computing device in Block S110; recording a first proportion of pixels of the digital advertisement rendered on a display of the mobile computing device during a first sampling period in Block S120; recording a second proportion of pixels of the digital advertisement rendered on the display of the mobile computing device during a second sampling period offset in time from the first sampling period in Block S122; calculating a cumulative pixel exposure of the digital advertisement at the mobile computing device based on a linear combination of a product of the first proportion of pixel and a duration of the first sampling period and a product of the second proportion of pixel and a duration of the second sampling period in Block S130; and, at a second time succeeding the first time, in response to the cumulative pixel exposure remaining below a threshold cumulative pixel exposure, re-serving the digital advertisement to the mobile computing device in Block S140.

Yet another variation of the method S100 shown in FIGS. 4A and 4B includes, for each user in a test population: at a first time, serving a first digital advertisement to a mobile computing device associated with the user, the first digital advertisement comprising a first advertisement format in Block S110; recording a first proportion of pixels of the first digital advertisement rendered on a display of the mobile computing device during a first sampling period in Block S120; recording a second proportion of pixels of the first digital advertisement rendered on the display of the mobile computing device during a second sampling period offset in time from the first sampling period in Block S122; calculating a cumulative pixel exposure of the first digital advertisement at the mobile computing device based on a linear combination of a product of the first proportion of pixel and a duration of the first sampling period and a product of the second proportion of pixel and a duration of the second sampling period in Block S130; and accessing a result of an advertising survey related to the first digital advertisement and the mobile computing device in Block S150. This variation of the method S100 also includes: generating an outcome model that predicts an outcome of this ad session as a function of cumulative pixel exposure based on cumulative pixel exposures and results of the advertising survey collected from users in the test population in Block S152; and defining a target cumulative pixel exposure representing an impression of the first advertisement format based on the outcome model in Block S160.

2. Applications

Generally, the method S100 can be executed by an advertising platform (hereinafter an "ad platform") to quantify an effect of a digital advertisement (hereinafter a "mobile ad") on a user's awareness of and/or interest in a brand or product depicted in the mobile ad based on durations of time that subregions of the mobile ad are rendered on the user's mobile computing device during an ad session (hereinafter a "cumulative pixel exposure"). For example, the ad platform or the mobile ad itself can integrate a proportion of pixels rendered within a viewport on the user's mobile computing device during an ad session while the mobile ad is loaded into a webpage viewed in a web browser at the user's mobile computing device. The ad platform can then selectively re-serve a mobile ad to the user's mobile computing device based on this cumulative pixel exposure. The ad platform can additionally or alternatively characterize and/or adjust a mobile advertising campaign based on cumulative pixel exposure of the mobile ad across a population of users.

2.1 Applications: Outcome Predictor

In particular, while click-through events in mobile ads may exhibit some correlation to user awareness of, interest in, and/or desire for a brand or product shown in a mobile ad, click-through events are binary and therefore offer minimal resolution into a degree of a user's interest in a brand or product presented in a mobile ad. Similarly, click-through events may be inadequate for predicting brand lift for a brand or product presented in a mobile ad, such as for longer-sale-cycle and/or more expensive products (e.g., automobiles, luxury watches, designer jewelry, etc.) for which additional content—accessible by selecting the mobile ad—is unnecessary to improve awareness, interest, and desire for a user.

Rather, Blocks of the method S100 can be executed by an ad platform: to calculate a time- and content-based quantitative metric representative of consumption of a digital mobile ad; to derive a relationship between this metric and certain outcomes (e.g., a qualitative measure of brand lift, probability of click-through, or probability of conversion of longer-sale-cycle products); and to leverage this relationship to inform future distribution of mobile ads to this and other users. The method S100 can therefore be executed by an ad platform to calculate a cumulative pixel exposure (i.e., a quantitative metric) based on an integral of the proportion of a mobile ad viewed by a user during an ad session. By repeating this process to calculate cumulative pixel exposures for the same mobile ad served to a population of users, the ad platform can combine these cumulative pixel exposure data and corresponding outcome data to derive a correlation between cumulative pixel exposure for the mobile ad and longer-term brand lift, longer-term conversions, and/or other outcomes among this population of users. For example, the ad platform can cooperate with a first mobile ad served to a user's mobile computing device to calculate a cumulative pixel exposure of the first mobile ad viewed by a user. The ad platform can then elect to serve either: a next mobile ad in the same advertising campaign to the user responsive to a high cumulative pixel exposure for the first mobile ad; or a mobile ad in a different advertising campaign to the user responsive to a low cumulative pixel exposure for the first mobile ad. The ad platform can thus calculate and respond to a cumulative pixel exposure for a user viewing a mobile ad on a mobile computing device, which may be a strong predictor of an outcome related to this mobile ad for this user.

2.2 Applications: Non-Linear Cumulative Pixel Exposure

Furthermore, consumption of less than the full height and width of a mobile ad may still yield increased awareness of and interest in content contained in the mobile ad for a user and may therefore result in a positive outcome related to this mobile ad for this user. Similarly, consumption of less than the full duration of an animation or video content in a mobile ad may still yield increased awareness of and interest in content contained in the mobile ad for a user. The ad platform can therefore implement a nonlinear model to compile pixels in a mobile ad viewed during an ad session into a cumulative pixel exposure, which may predict user awareness of and/or interest in content in the mobile ad (e.g., "brand lift"). For example, if the top 20% of a mobile ad served to a user's mobile computing device excludes a call to action or branded content, the total possible brand lift yielded by viewing the top 20% of the mobile ad may be less than 5% of the brand lift yielded when 100% of the mobile ad is shown. Similarly, if the top 20% of the mobile ad does include a call to action and branded content, the total brand lift yielded by viewing the top 20% of the mobile ad may be as much as 80% of the brand lift yielded when 100% of the mobile ad is shown. In another example, 100% of a mobile ad shown for six seconds on a mobile computing device may not necessarily yield twice the brand lift as 100% of the mobile ad shown on the mobile computing device for two seconds. Rather, 100% of the mobile ad shown for two seconds may yield 80% of the brand lift yielded when 100% of the same mobile ad is rendered on the mobile computing device for six seconds. In yet another example, the top 20% of a mobile ad rendered on a mobile computing device for six seconds may yield less value than 80% of the same mobile ad rendered on the mobile computing device for two seconds.

The ad platform can therefore execute Blocks of the method S100 to: track which pixels of a mobile ad are rendered on a user's mobile computing device; track durations of time that these pixels are rendered; and transform the proportion of pixels rendered, durations of time over which these pixels are rendered, and various other factors—such as different weights of pixels in the mobile ad, a format of the mobile ad, a format of the mobile computing device, etc. —into a quantitative metric exhibiting higher-resolution insight into a change in a user's awareness of a brand and/or desire for a product presented in the mobile ad.

The method S100 is described below as a method for tracking cumulative pixel exposure of a user viewing a mobile ad loaded into a web browser executing on a mobile computing device (e.g., a smartphone, a tablet). However, the method S100 can be similarly implemented to track cumulative pixel exposure for a user viewing a mobile ad within a native application executing on the user's mobile computing device or in a document of any other type rendered by the user's mobile computing device. Furthermore, the method S100 can be executed to track cumulative pixel exposure for a user viewing a digital ad in any other format within a web browser or other native application executing on a desktop, laptop, or other computing device.

3. Ad Serving

Block S110 of the method S100 recites, at a first time, serving a mobile ad to a mobile computing device. Generally, various Blocks of the method S100 can be executed by an ad platform hosted on a remote computer system, such as a remote server. The ad platform can: access a mobile ad from an internal or external database (e.g., a server or local file storage), such as over the Internet; serve the mobile ad to a mobile computing device for insertion into a webpage or other document inline within other content; interface with the mobile ad to track clusters of pixels, rows of pixels, individual pixels, and/or other area units of the mobile ad rendered on a display of the mobile computing device during an ad session (e.g., until a user navigates away from the webpage); and then transform these pixel and time data into a cumulative pixel exposure value for the instance of the mobile ad viewed by the user at the mobile computing device. The ad platform can additionally or alternatively upload the mobile ad to an ad exchange, to a publisher ad server, to an advertising agency ad server, and/or to another content distribution network (hereinafter "CDN") for distribution to the user's mobile computing device; and the mobile ad can convey pixel and time data back to the ad platform via the Internet for remote processing by the ad platform.

Thus, when a user navigates to a publisher's webpage via a web browser or to a document within a mobile application executing on her smartphone, tablet, or other computing device, a web server hosted by the publisher can return content or pointers to content for the webpage (e.g., in Hypertext Markup Language, or "HTML", or a compiled instance of a code language native to a mobile operating system), including formatting for this content and a publisher ad tag that points the web browser or app to the publisher's ad server (e.g., a network of external cloud servers). The ad server can then implement an ad selector to select a particular ad to serve to the web browser or native application and either: return the selected ad directly to the web browser or native application; or return a second ad tag that redirects the browser or native application to an advertiser or publisher ad server. In the latter case, the advertiser or publisher ad server can return a third ad tag that redirects the web browser or app to a CDN, which may include a network of cloud servers storing raw creative graphics for the ad, and the CDN can return the selected ad to the web browser.

In the foregoing implementation, if the ad server selects the mobile ad, the ad server or CDN can return the mobile ad—such as in the form of content within an HTML mobile ad—to the web browser in Block S110, and the web browser can then place the mobile ad within the webpage. While the webpage is open in the web browser, the mobile ad can record an area of the mobile ad rendered on the display of the mobile computing device during an ad session—such as a number of pixels, a proportion of pixels, addresses of pixel rows, etc. visible in a viewport on the mobile computing device per sampling period—in Blocks S120 and S122 and then return these pixel and time values to the ad platform for processing in Block S130.

4. Time Per Pixel

Block S120 of the method S100 recites recording a first proportion of pixels of the mobile ad rendered on a display of the mobile computing device during a first sampling period; and Block S122 of the method S100 recites recording a second proportion of pixels of the mobile ad rendered on the display of the mobile computing device during a second sampling period offset in time from the first sampling period in Block S122. Generally, in Blocks S120 and S122, the mobile ad can record areas (e.g., single pixels, clusters of pixels representing discrete iconography, discrete rows of pixels, or groups of pixel rows) of the mobile ad visible in the viewport at the mobile computing device—and therefore likely viewed by the user—during the ad session.

4.1 Static Ad

In one implementation shown in FIG. 1, the mobile ad includes a static banner ad inserted into a webpage within a web browser and spans approximately the full width of the web browser rendered on the mobile computing device. As the user scrolls up and down through the webpage, rows of pixels in the mobile ad may come into and move out of view in the web browser. While the webpage is open in the web browser, the mobile ad can regularly record a proportion of the total area, a proportion of rows of pixels (i.e., a ratio of rows of pixels in view to a total number of rows of pixels of the mobile ad), or addresses of specific rows of pixels of the mobile ad rendered on the display of the mobile computing device. For example, the mobile ad can record these viewability data at a sampling rate of 5 Hz (i.e., once per 200 milliseconds). In a similar implementation, if the user zooms into the webpage such that less than a full width of the mobile ad is rendered on the display of the mobile computing device, the mobile ad can record a proportion of the total area, segments of rows of pixels, or addresses of specific pixels of the mobile ad rendered on the display during each sampling period.

During each sampling period after the mobile ad is loaded onto the webpage or after a first pixel in the mobile ad is moved into the viewport at the user's mobile computing device, the mobile ad can return a timestamped value representing viewability of the mobile ad (e.g., a proportion of total area, addresses of specific rows of pixels, or addresses of specific pixels visible in the viewport) to the ad platform in (near) real-time. For example, the mobile ad can stream these timestamped viewability data to the ad platform in real-time at a rate of 5 Hz. Alternatively, the mobile ad can write these values to a data structure and return this data structure to the ad platform once the webpage is closed at the mobile computing device or once a scroll event at the mobile computing device moves the mobile ad fully out of the viewport.

4.2 Animation and Video

In another implementation, the mobile ad includes an animation or video segment replayed inside of the mobile ad. In this implementation, once the mobile ad is loaded onto a webpage and a first frame of the animation or video is rendered—in part or in whole—in the web browser, the mobile ad can record a proportion of the total area, a proportion of rows of pixels, segments of rows of pixels, addresses of specific rows of pixels, or addresses of specific pixels of the frame rendered on the display of the mobile computing device. The mobile ad can repeat this process for each frame of the animation or video, such as at a rate of 24 Hz for an animation or video characterized by a frame rate of 24 frames per second, and tag each of these values with a timestamp or other identifier of the corresponding frame of the animation or video.

Furthermore, the mobile ad can pause replay of the animation or video when less than a threshold proportion of the mobile ad is shown in the web browser, as described in U.S. patent application Ser. No. 15/217,879, filed on 22 Jul. 2016, which is incorporated in its entirety by this reference. For example, the mobile ad can pause replay of the animation or video at a particular frame when a scroll event moves less than a threshold proportion (e.g., 70%) of the mobile ad into view in the web browser or moves more than the threshold proportion of the mobile ad out of view in the web browser. While the animation or video is paused on the particular frame, the mobile ad can implement the foregoing methods to regularly record a proportion of total area, addresses of specific rows of pixels, or addresses of specific pixels, etc. of the particle frame rendered on the display, such as at the same sampling rate of 24 Hz.

The mobile ad can then return timestamped values representing proportions of the total areas of each frame of the animation or video shown in the web browser to the ad platform in Blocks S120 and S122, such as in real-time or asynchronously, as described above.

In a similar implementation in which the mobile ad includes a video segment—such as spanning all or a subarea of the mobile ad—the mobile ad can record a proportion of pixels (or specific pixel rows, addresses of individual pixels, etc.) of frames in the video rendered in the viewport during the ad session. For example, the mobile ad can record a first proportion of pixel rows in a first frame of the video segment rendered on the display of the mobile computing device during a first sampling period in Block S120; record a second proportion of pixel rows in a second frame of the video segment rendered on the display of the mobile computing device during a second sampling period in Block S122; and repeat this process for each other frame rendered during the ad session (e.g., at a rate of 24 Hz). Alternatively, the mobile ad can execute this process for a subset of frames in the video, such as every fifth frame in the video, and the mobile ad or the ad platform can interpolate proportions of pixels in frames therebetween rendered in the viewport. Thus, in Block S130, the ad platform can calculate the cumulative pixel exposure that represents a proportion of a total area of frames in the video segment in the mobile ad displayed on the mobile computing device during an ad session.

4.3 Carousel

In another implementation, the mobile ad includes a horizontal carousel or magazine of cards, each containing unique ad content. In this implementation, the mobile ad renders a subset of cards at any one time and cycles horizontally through the set of cards in response to lateral swipe inputs into the mobile computing device over the mobile ad. Once the mobile ad is loaded onto a webpage, the mobile ad can record a proportion of the total area, a segment of rows of pixels, or addresses of specific pixels—across the full width and height of the horizontal carousel—rendered on the display of the mobile computing device during each sampling period, such as at a sampling rate of 5 Hz. Alternatively, the mobile ad can record a proportion of the total area, segments of rows of pixels, or addresses of specific pixels—in each discrete card in the carousel—rendered on the display of the mobile computing device during each sampling period. The mobile ad can return a timestamped value representing this proportion of total area, addresses of specific rows of pixels, or addresses of specific pixels rendered on the display during each sampling period to the ad platform in real-time or once the webpage is closed at the mobile computing device, as described above.

In a similar implementation in which the mobile ad includes a set of cards arranged laterally within a visual element, the mobile ad can record a first proportion of pixel rows in a first card, in the set of cards, rendered on the display of the mobile computing device by default during a first sampling period in Block S120. Later and following a lateral swipe event over the visual element at the mobile computing device that triggers the visual element to index laterally through the set of cars, the mobile ad can record a second proportion of pixel rows in a second card, in the set of cards, rendered on the display of the mobile computing device during the second sampling period in Block 122. The mobile ad can repeat this process to record proportions of pixels (or discrete pixels, rows of pixels) in each card in the visual element rendered in the viewport as vertical scroll events move the visual element into and out of the viewport and as lateral swipe events index through cards within the visual element during this ad session. Upon receipt of these proportion data from the mobile ad, the ad platform can calculate a cumulative pixel exposure that represents a proportion of a total area of the set of cards displayed on the mobile computing device during this ad session in Block S130.

However, the mobile ad can implement any other method, technique, or sampling rate to record a "snapshot" of regions of a static ad, regions of frames in an animated or video ad, or regions of an interactive ad of any other format rendered on a mobile computing device during an ad session in Blocks S120 and S122. The mobile ad can also return these data to the ad platform in any other format and in response to any other event.

4.3 Pinger

Figure 3:
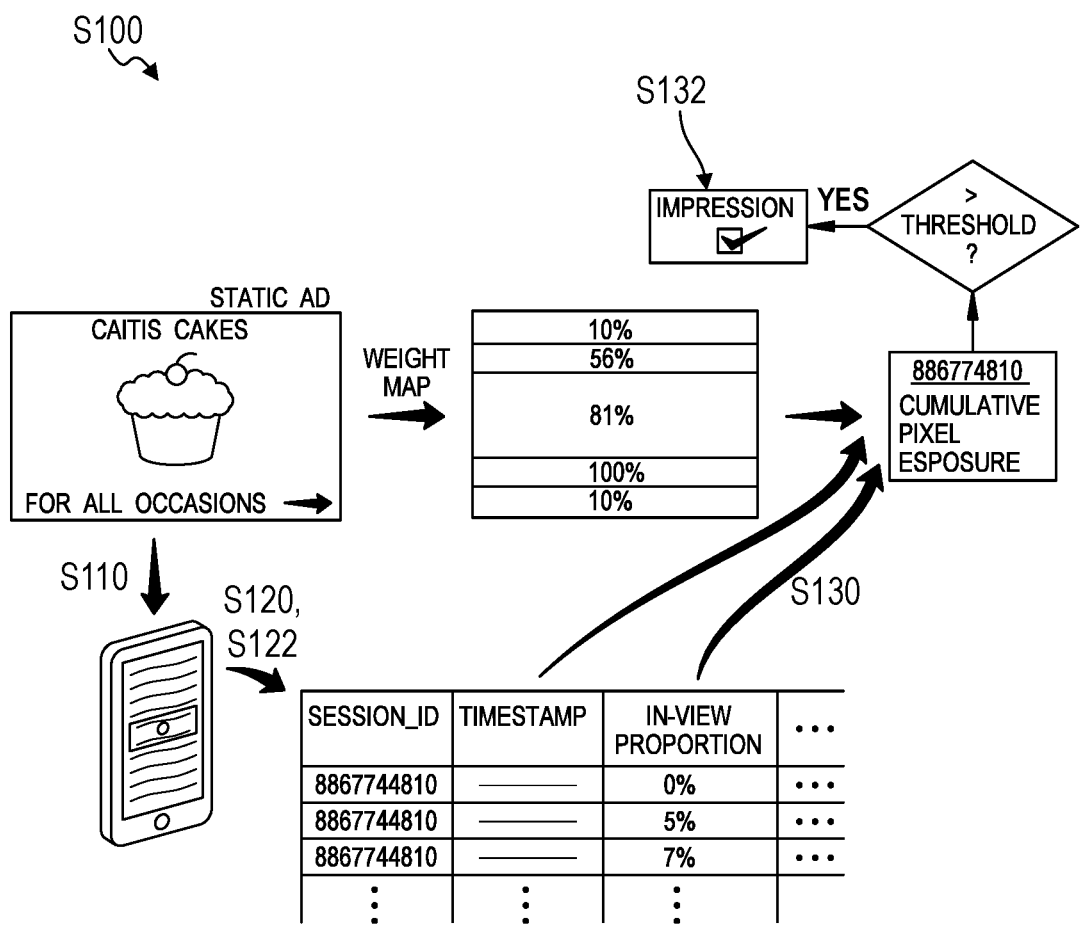
FIG. 3 is a flowchart representation of one variation of the method.

In one variation described in U.S. Provisional Patent Application No. 62/694,419 and shown in FIGS. 2 and 3, once the mobile ad is loaded into the webpage at a mobile computing device, the mobile ad generates a "ping" containing basic viewability data for the current sampling period and outputs this ping to a computer network on a regular interval (e.g., 200 milliseconds, or at a rate of 5 Hz) until the webpage is closed or until a threshold duration of time (e.g., ten minutes) has passed since the mobile ad was loaded into the webpage.

For example, the mobile ad can compile: identifying metadata, including a page view ID, a placement ID, and a creative ID; a timestamp; and a proportion of pixels, address of pixel rows, or addresses of individual pixels rendered in the viewport at the mobile computing device during the current sampling period into a ping. The mobile ad can incorporate additional data into a ping, such as including: whether a target pixel (e.g., top-left pixel) of the mobile ad is in the viewport; whether a top pixel (or top row of pixels) and/or the bottom pixel (or the bottom row of pixels) in the mobile ad is visible in the viewport; a vertical location of the ad relative to the viewport; a horizontal location of the ad relative to the viewport; a horizontal position of the ad content within the mobile ad; an orientation of the mobile computing device in real space (e.g., gyroscope values output by an IMU in the mobile computing device); a zoom level or resolution of the webpage; or whether the mobile ad has been selected (e.g., a "click-through"). The mobile ad can then return this ping via a cellular, Wi-Fi, local area, or other network and then repeat this process during a next sampling period (e.g., 200 milliseconds later).

In one variation, the mobile ad generates and outputs pings only when a minimum proportion (e.g., a single row of pixels) of the mobile ad is visible in the viewport at the mobile computing device. For example, the mobile ad can: generate an "in-key ping" specifying a time that the mobile ad came into view in the viewport; return this in-key ping to the computer system; and then transition into generating and returning pings to the computer system on a regular interval (e.g., at a rate of 5 Hz), as described above. The mobile ad can continue to return pings on this interval until the minimum proportion of the mobile ad moves out of the viewport, at which time the mobile ad can: generate an "out-key ping" specifying a time that the mobile ad moved out of view in the viewport; return this out-key ping to the computer system; and then cease transmission of pings to the computer system until (and if) the mobile ad comes back into view within the viewport at a later time.

Therefore, the mobile ad can stream data representing proportions of the visual element rendered within a viewport at the mobile computing device—to a remote aggregator via a computer network—on a regular interval between entry of a portion of the visual element into the viewport and exit of the visual element from the viewport. In Blocks S120 and S122, the remote aggregator (e.g., the ad platform) can thus integrate proportions of the visual element rendered within the viewport at the mobile computing device based on a duration of the regular interval in order to calculate the cumulative pixel exposure between entry of the portion of the visual element into the viewport and exit of the visual element from the viewport. The ad platform can then store this cumulative pixel exposure—linked to the user—in a remote database in preparation for selecting a future digital advertisement for the user based on the user's engagement with the mobile ad, and characterized by this cumulative pixel exposure.

5. Total Ad Exposure

Block S130 of the method S100 recites calculating a cumulative pixel exposure of the mobile ad at the mobile computing device based a combination of: a product of the first proportion of pixel and a duration of the first sampling period; and a product of the second proportion of pixel and a duration of the second sampling period; etc. for each sampling period at the mobile ad. Generally, in Block S130, the ad platform compiles proportions of the total area, addresses of specific rows of pixels, or addresses of specific pixels, etc. of the mobile ad rendered on the user's mobile computing device during an ad session and a known interval between sampling periods (e.g., 200 milliseconds) in the ad session into a single quantitative value representing the user's exposure to all content in the mobile ad. (Alternatively, the mobile ad can execute Block S130 locally and return a cumulative pixel exposure to the ad platform, such as following each sampling period.)

5.1 Static Uniform Weighing

In one implementation shown in FIGS. 1 and 3, the ad platform: calculates a first proportion (e.g., 0-100%) of the mobile ad rendered on the mobile computing device during a first sampling period; calculates a first square of the first proportion; calculates a first product by multiplying the first square by the duration of the first sampling period (e.g., 200 milliseconds); calculates a second proportion of the mobile ad rendered on the mobile computing device during a second sampling period immediately succeeding the first sampling period; calculates a second square of the second proportion; calculates a second product by multiplying the second square by the duration of the second sampling period; calculates a third proportion of the mobile ad rendered on the mobile computing device during a third sampling period immediately succeeding the second sampling period; and calculates a third square of the third proportion; calculates a third product by multiplying the third square by the duration of the third sampling period; etc. for each sampling period during the ad session. The ad platform then sums each product to calculate a cumulative pixel exposure for the mobile ad during the ad session.

5.2 Static Non-Uniform Weighing

In another implementation, the ad platform accesses a lookup table or other data structure assigning a weight to each row of pixels in the mobile ad, such as ranging from "0" to "10" based on: alignment between brand colors and colors of pixels in a row; intersection of the row of pixels with a brand name, brand message, or call to action; proximity to other high-value rows of pixels; etc. In this implementation, the ad platform: calculates a sum of weights of each row of the mobile ad rendered on the display of the mobile computing device during a first sampling period; divides this sum by the total sum weight of all rows of pixels of the mobile ad; calculates a first square of this product; and calculates a first weighted product for a region of the mobile ad rendered on the mobile computing device during the first sampling period by multiplying the first square by the duration of the first sampling period. The ad platform can repeat this process for each sampling period during the ad sessions and then sum each of these products to calculate a cumulative pixel exposure for the mobile ad during the ad session.

In another implementation in which the mobile ad includes an animation or video, the ad platform can access a data structure assigning a weight to each row of pixels in each frame of the mobile ad, such as according to parameters described above. In this implementation, the ad platform can: calculate a sum of weights of each row of a first frame of the mobile ad rendered on the display of the mobile computing device during a first sampling period based on weights assigned to regions, rows of pixels, or individual pixels in the first frame by the data structure; divide this sum by the total sum weight of all rows of pixels of the first frame; calculate a first square of this product; and calculate a first weighted product for a region of the first frame rendered on the mobile computing device during the ad session by multiplying the first square by a time interval between frames (e.g., 42 milliseconds for a frame rate of 24 frames per second). The ad platform can repeat this process for each frame of the mobile ad and then sum each of these products to calculate a cumulative pixel exposure for the mobile ad during the ad session.

In a similar implementation in which the mobile ad includes a horizontal catalog of multiple cards containing ad content, the ad platform can access a data structure assigning a weight to each column (or segment of columns) of pixels in the mobile ad, such as according to parameters described above. The ad platform can then implement the foregoing methods and techniques to calculate a first weighted product for a region of the horizontal catalog rendered on the mobile computing device during a first sampling period; repeat this process for each other sampling period in the ad session; and then sum each of these products to calculate a cumulative pixel exposure for the mobile ad during the ad session.

In a similar implementation, the ad platform: accesses a map (or lookup table, etc.) that defines weights of visual content within the mobile ad; accesses a first weight of the first product defined by the map for a first region of the digital advertisement represented by the first proportion of pixels; accesses a second weight of the second product defined by the map for a second region of the digital advertisement represented by the second proportion of pixels in Block S130; and then sums the first product, weighted according to the first weight, and the second product, weighted according to the second weight, to calculate the cumulative pixel exposure.

In one example, the mobile ad: records display of the first proportion of pixels—including a first row of pixels in the mobile ad exclusively—in the mobile ad within a viewport rendered on the display of the mobile computing device during a first sampling period in Block S120; and records display of the second proportion of pixels—including both the first row of pixels and a second row of pixels below the first row of pixels—in the mobile ad within the viewport during the second sampling period in Block S122. Then, according to the map, the ad platform can assign a greater weight to the second proportion of the mobile ad than the first proportion of the mobile ad since the second proportion includes both a) more visual content and b) visual content nearer the center of the mobile ad, which may therefore make the second proportion of the mobile ad more visually comprehensible for the user. The ad platform can similarly weight other proportions of the mobile ad rendered during other sampling periods within the ad session as a function of a) magnitude of these proportions and b) proximity to these proportions to the center of the mobile ad (or proximity to another target area, such as a call to action, within the mobile ad). The ad platform can then combine these proportions according to their weights (and multiplied by durations of their corresponding sampling periods) to calculate a cumulative pixel exposure for this ad session in Block S130.

In a similar example, the mobile ad: records the first proportion of pixels that spans a background area within the mobile ad, such as near the top or bottom edge of the mobile ad, in Block S120; records the second proportion of pixels spanning both the background area and a segment of iconography within the mobile ad (e.g., text, an icon, or a fixture in an image in the mobile ad) in Block S122; and records a third proportion of pixels—spanning a call to action within the mobile ad—rendered on the display of the mobile computing device during a third sampling period offset in time from the second sampling period. The map (or lookup table, etc.) for the mobile ad can assign a low weight (or "value," viewability") to edges of the mobile ad, higher weights to iconography in the mobile ad, and even greater weight to a call to action within the mobile ad. Thus, based on the map for the mobile ad, the second proportion of pixels containing the segment of iconography within the mobile ad, the ad platform can then calculate a second weight of the second proportion of pixels that exceeds a first weight of the first proportion of pixels rendered on the mobile computing device during this ad session. Similarly, based on the map and the third proportion of pixels containing the call to action, the ad platform can calculate a third weight of the third product greater than the second weight of the second product. The ad platform can then calculate the cumulative pixel exposure by summing: the first product (of the first proportion of pixels and the duration of the first sampling period) weighted according to the first weight; the second product (of the second proportion of pixels and the duration of the second sampling period) weighted according to the second weight; and the third product (of the third proportion of pixels and the duration of the third sampling period) weighted according to the third weight.

5.3 Dynamic Weighing

In the foregoing implementations, the ad platform can dynamically alter weights assigned to areas, rows of pixels, or discrete pixels based on events occurring at the mobile computing device during the ad session. For example, the mobile ad can track scroll events that bring the mobile ad into and out of view at the mobile computing device and return a sequence of timestamped scroll events to the ad platform. The ad platform can then implement a low or default weight value(s) for areas of the mobile ad viewed during the ad session as following a first scroll down event that brings the mobile ad into view in the web browser. If the mobile ad is then moved out of view in the web browser during a second scroll down event (or during the first scroll down event) and then moved back into view in the web browser during a scroll up event, the annotation portal platform can: associate this third scroll up event with possible interest in the mobile ad; and increase the weights assigned to each area, row of pixels, or discrete pixel accordingly. The ad platform can thus apply a greater weight to pixels in the mobile ad viewed after the scroll up event than before the scroll up event and can aggregate durations that these weighted areas, rows of pixels, or discrete pixels are viewed before and after the scroll up event into a single cumulative pixel exposure value, as described above.

However, the ad platform can dynamically adjust weighting of areas, rows of pixels, or discrete pixels, etc. of the mobile ad based on any other event during the ad session.

5.4 Other Factors

In one variation, the ad platform (or the mobile ad locally) can also adjust the cumulative pixel exposure for the ad session based on other parameters. In one implementation, the ad platform calculates an adjustment factor proportional to a size of the display of the mobile computing device or proportional to a zoom level at which the mobile ad is viewed on the mobile computing device (e.g., from "0.5" to "2.0") and scales the cumulative pixel exposure according to the adjustment factor, thereby: compensating for consumption of the mobile ad on a very small display or high zoom-out level (e.g., with an adjustment factor of "0.5"), which may attenuate user awareness and/or interest in an advertised product or brand; and compensating for consumption of the mobile ad on a large display or high zoom-in level (e.g., with an adjustment factor of "2.0"), which may yield improved user awareness and/or interest in an advertised product or brand.

In another implementation, the ad platform implements the foregoing methods and techniques to calculate cumulative pixel exposure values for consumption of ads of various mobile ad formats (e.g., static ads, animated ads, video ads, interactive ads, etc.) across a population of users. Because content may be communicated and consumed differently across ads of different ad formats, the system can implement an ad format normalization factor to normalize cumulative pixel exposure values across different ad formats. For example, the system can access a lookup table or other data structure specifying an ad format normalization factor for each ad format and can divide a cumulative pixel exposure by the ad format normalization factor associated with an ad format of the corresponding ad.

Similarly, the ad platform can normalize cumulative pixel exposure values across mobile ads of the same or different ad format. For example, the system can sum a weight assigned to each pixel (or the square of the weight assigned to each pixel) in the mobile ad and divide the cumulative pixel exposure by this sum, thereby normalizing the cumulative pixel exposure.

5.5 Pixel Duration

In one variation, the ad platform compiles viewability data received from the mobile ad for the ad session, such as in the form of a sequence of pings, into durations of time that individual pixels, discrete clusters of pixels, discrete rows of pixels, or other discrete regions of the mobile ad were visible in the viewport at the mobile computing device during the ad session. For example, the ad platform can compile viewability data received from the mobile ad into: a first duration of time that a first set of pixels in the mobile ad were rendered within the viewport on the mobile computing device during an ad session in Block S120; and a second duration of time that a second set of pixels in the digital advertisement—distinct from the first set of pixels—were rendered within the viewport during the ad session in Block S122. The ad platform can then: implement a static or dynamic map, as described above, to determine weights of each set of pixels in the mobile ad; calculate a first product of the first duration of time and a first proportion of the digital advertisement corresponding to the first set of pixels; calculate a second product of the second duration of time and a second proportion of the digital advertisement corresponding to the second set of pixels; and calculate a cumulative pixel exposure of the mobile ad during this ad session based on a combination of the first product, weighted according to the first weight, and the second product, weighted according to the second weight.

However, the ad platform can implement any other method or technique to access viewability data from the mobile ad and to compile these viewability data into a cumulative pixel exposure for the mobile ad during the current ad session at the user's mobile computing device.

5.6 Local Cumulative Pixel Exposure Calculation

In one variation, the mobile ad implements the foregoing methods and techniques locally to calculate a cumulative pixel exposure for the current ad session and then returns this cumulative pixel exposure to the ad platform, such as at the conclusion of the ad session (e.g., when the mobile ad is moved fully outside of the viewport or when the webpage is closed at the mobile computing device). For example, the mobile ad can: record a first proportion of pixel rows of the mobile ad rendered within the viewport at the mobile computing device during a first sampling period in response to a portion of the visual element entering the viewport; record a second proportion of pixel rows of the mobile ad rendered within the viewport at the mobile computing device during the second sampling period; sum the first proportion of pixel rows integrated over the first sampling period and the second proportion of pixel rows integrated over the second sampling period to calculate the cumulative pixel exposure; and then return the cumulative pixel exposure to a remote database (e.g., to the ad platform) via a computer network in response to the visual element exiting the viewport at the mobile computing device to trigger the end of the current ad session.

However, in this variation the mobile ad can implement any other method or technique to calculate a cumulative pixel exposure for the current ad session.

6. Outcome Model

One variation of the method S100 includes: Block S150, which recites accessing results of an advertising survey related to the advertisement across a test population of users; and Block S152, which recites generating an outcome model that predicts an outcome of the ad session as a function of cumulative pixel exposure based on cumulative pixel exposures and results of the advertising survey collected from users in the test population. Generally, in Blocks S150 and S152, the ad platform can link a cumulative pixel exposure of the mobile ad to a degree. For example, the ad platform can: retrieve a corpus of cumulative pixel exposures of instances of the mobile ad served to a population of mobile computing devices; access a corpus of results of a brand lift survey related to the mobile ad and supplied to this population of mobile computing devices; link individual cumulative pixel exposure to individual survey results (e.g., based on common identifiers, such as IP addresses, cookies, and/or statistical identifiers); and then implement machine learning or statistical methods to calculate a correlation between cumulative pixel exposure and degree of brand lift for this mobile ad from these data.

6.1 Brand Lift

In one implementation, the ad platform determines a correlation between cumulative pixel exposure and degree of brand lift that is unique to one mobile ad in Block S152. For example, the ad platform can test the mobile ad across a population of users, including serving an instance of the mobile ad, recording a cumulative pixel exposure, and collecting a survey result at each mobile computing device across a test population of users. The ad platform can then implement machine learning, artificial intelligence, and/or statistical methods, etc. to link cumulative pixel exposure to brand lift across this population of users, such as before deploying this mobile ad to a larger population of users in order to enable confirmation of effectiveness of the mobile ad in achieving brand lift, to define target metrics for this mobile ad, and to determine when the mobile ad is underperforming.

In this implementation, the ad platform can: access brand lift survey results associated with identifiers of mobile computing devices (e.g., IP addresses, cookies, statistical identifiers, etc.); associate each cumulative pixel exposure calculated in Block S130 with an identifier of a mobile computing device; and then link a subset of these brand lift survey results to cumulative pixel scores based on common identifiers to form a corpus of brand lift survey results from users previously exposed to the mobile ad to a known degree. For brand lift survey data that represents degrees of user awareness of interest in the brand or product represented in the mobile ad, the ad platform can then group (or "bucket") similar survey results. For example, the ad platform can segment survey results in quartiles or quintiles of awareness or interest, such as: 0-20% or "no" awareness; 20-40% or "low" awareness; 40-60% or "moderate" awareness; 60-80% or "good" awareness; and 80-100% or "strong" awareness. The ad platform can then calculate an average or other linear combination of cumulative pixel exposure values linked to survey results in each bucket to predict a cumulative pixel exposure that will yield the corresponding degree of awareness or interest in a brand or product represented in the mobile ad. The ad platform can thus generate a non-parametric outcome model that links one distinct cumulative pixel exposure value or range of cumulative pixel exposures to a particular degree of brand lift.

Alternatively, for the brand lift survey results that indicate binary positive or no increase in awareness or interest, the ad platform can group cumulative pixel exposures into discrete ranges, such as into quartiles or quintiles ranging from no or minimal cumulative pixel exposure to a maximum known cumulative pixel exposure. The ad platform can then: calculate a ratio of positive survey results to total survey results (i.e., "brand lift") for each discrete cumulative pixel exposure range; and associate each cumulative pixel exposure range with its corresponding brand lift value to thus generate a non-parametric outcome model linking ranges of cumulative pixel exposure to ranges of brand lift, as shown in FIG. 1.

Alternatively, the ad platform can: plot binary or higher-resolution brand lift survey results against cumulative pixel exposure values; and then implement regression techniques to calculate a best-fit parametric outcome model linking brand lift to cumulative pixel exposure. However, in Blocks S150 and S152, the ad platform can implement any other method or technique to generate a parametric or non-parametric outcome model linking cumulative pixel exposure to degree of brand lift for the singular mobile ad. Furthermore, as a mobile advertising campaign is executed, the ad platform can continue to collect such brand lift survey and cumulative pixel exposure data and update and refine this outcome model over time.

The ad platform can similarly generate a parametric or non-parametric outcome model linking cumulative pixel exposure to degree of brand lift for a particular ad format by aggregating cumulative pixel exposures and survey results of various mobile ads—of the same mobile ad format—served over time, such as over multiple distinct mobile advertising campaigns. The ad platform can similarly generate a generic parametric or non-parametric outcome model linking cumulative pixel exposure to degree of brand lift for all supported ad formats and update this outcome model over time as new brand lift survey and cumulative pixel exposure data is collected over time.

6.2 Conversions

Similarly, the ad platform can: access long-term conversion data, such as navigation to brand website or purchases of advertised products by users days, weeks, or months after viewing mobile ads; link these conversion data to cumulative pixel exposures of these users to mobile ads of one or various mobile ad formats; and then implement the foregoing methods and techniques to generate a parametric or non-parametric outcome model linking cumulative pixel exposure to conversion rate for a particular mobile ad format or for all supported ad formats. For example, the ad platform can access "digital conversion" data, such as: user purchase behavior on an e-commerce site after viewing the mobile ad associated with the e-commerce site or a product listed on the e-commerce site; user signups for an offer after viewing the mobile ad or portions of related mobile ads over multiple ad sessions; or user signups to be contacted for more information (e.g., "lead generation conversion") after viewing the mobile ad or portions of related mobile ads over multiple ad sessions; etc. Therefore, the ad platform can generate a outcome model that outputs a proxy value for conversion rate based on cumulative pixel exposure, thereby enabling preemptive adjustment of a mobile advertising campaign to achieve a future conversion rate based on current cumulative pixel exposures across a population of users served a mobile ad.

The ad platform can implement similar methods and techniques to access offline conversion data and to derive a model linking offline conversion data to the mobile ad.

6.3 Artificial Intelligence

In another implementation shown in FIG. 4A, when testing the mobile ad across a population of users before deploying the mobile ad (or the ad campaign) to a larger user segment, the ad platform can collect and/or derive additional engagement metrics from instances of the mobile ad served to this population of users. For example, for one instance of the mobile ad served to a user in this population, the ad platform can collect or calculate: a total duration that any area of the mobile ad was visible in a viewport during an ad session; whether the mobile ad was fully in-view at the viewport at any time during the ad session; a quantity of scroll events over the mobile ad; the orientation of a mobile computing device on which the mobile ad was loaded; whether a touch input was located over the mobile ad during this ad session; and whether a target outcome occurred for this user or mobile ad; etc., such as described in U.S. Patent Application No. 62/694,419. The ad platform can then implement linear regression, artificial intelligence, a convolutional neural network, or other analysis techniques to characterize (e.g., quantify) associations between the target outcome and: cumulative pixel exposure; total duration of time that the mobile ad was visible; whether the mobile ad was ever fully in-view; scroll events; mobile computing device orientation; etc.

Then, responsive to a high correlation between this target outcome and cumulative pixel exposure for this mobile ad, the ad platform can automatically determine that cumulative pixel exposure is a good or sufficient predictor of this target outcome; and vice versa. If the ad platform thus determines that cumulative pixel exposure is a good predictor of this target outcome and later serves a new instance of the mobile ad to a new user, the ad platform can predict the new user's probability of performing this target outcome based on a new cumulative pixel exposure for this new instance of the mobile ad. If the new cumulative pixel exposure is high, the ad platform can elect to serve this same mobile ad or a second mobile ad in the same ad campaign (e.g., advertising the same brand or product) to the new user at a second, later time in order to reinforce this target outcome. However, given a high correlation between cumulative pixel exposure and this target outcome for this mobile ad but a low cumulative pixel exposure for this new user, the ad platform can later elect to serve a different mobile ad from a different ad campaign to the new user, since this different mobile ad may achieve a better response from the user. Furthermore, given a low correlation between cumulative pixel exposure and this target outcome for this mobile ad, the ad platform can determine whether to reserve the mobile ad, serve a second mobile ad in the same ad campaign, or serve a mobile ad from a different ad campaign to a new user based on other engagement metrics for the instance of the mobile ad served to this new user, as described in U.S. Patent Application No. 62/694,419.

Therefore, the ad platform can generate an outcome model that weights various engagement metrics for a mobile ad, and the ad platform can execute ad serving decisions based on this outcome model and historical engagement metrics—including cumulative pixel exposure—collected from a user.

7. Mobile Advertising Campaign

The ad platform, a publisher, or an advertising agency, etc. can then tailor a mobile advertising campaign based on cumulative pixel exposures, such as before launching the mobile advertising campaign or while the mobile advertising campaign is in process. The ad platform can also selectively serve mobile ads to users based on these cumulative pixel exposures.

In one example shown in FIGS. 4A and 4B, the ad platform calculates both a threshold cumulative pixel exposure that indicates at least a minimum engagement with the mobile ad (e.g., a minimum probability of a target outcome) and a target cumulative pixel exposure correlated with a target degree of engagement with the mobile ad (e.g., a high probability of the target outcome). Then, if the cumulative pixel exposure for a new user served the mobile ad is less than the threshold cumulative pixel exposure, the ad platform can elect to serve mobile ads in a different ad campaign to the user in the future; however, if the cumulative pixel exposure for this new user served the mobile ad falls between the threshold cumulative pixel exposure and the target cumulative pixel exposure, the ad platform can elect to re-serve the same mobile ad to the user in the future in order to increase the user's total cumulative pixel exposure for this mobile ad; furthermore, if the cumulative pixel exposure for this new user served the mobile ad exceeds the target cumulative pixel exposure, the ad platform can elect to serve a different mobile ad in the same ad campaign to the user in the future in order to reinforce the user's engagement with the brand or product presented in this ad campaign.

7.1 Ad Impression

One variation of the method S100 shown in FIG. 4A includes Block S160, which recites defining a target cumulative pixel exposure representing an impression of the first advertisement format based on the model. Generally, in this implementation, the system can: determine a cumulative pixel exposure that yields at least a minimum amount or probability of positive brand lift; store this cumulative pixel exposure as constituting an "ad impression"; and then count each ad session—across a population of mobile computing devices—that results in at least this cumulative pixel exposure as an ad impression.

In one implementation, prior to deploying the mobile ad to a larger population of users, the mobile ad can be tested across a population of users to collect cumulative pixel exposures for the mobile ad viewed by these users and then analyze these data to determine a correlation (e.g., a "covariance") between cumulative pixel exposure and brand lift. Accordingly, the ad platform can: determine a minimum cumulative pixel exposure for the mobile ad that yields at least a target minimum brand lift for one user or across this population of users; and then specify that an ad session in which this mobile ad is viewed qualifies as an "impression" if the cumulative pixel exposure for this mobile ad during this ad session exceeds this minimum (or "threshold") cumulative pixel exposure. The ad platform can then deploy this mobile ad to a greater population of users and implement this minimum cumulative pixel exposure to selectively count impressions for this mobile ad across this greater population of users.

In one example of the foregoing implementation, the ad platform can serve a set of instances of the mobile ad to mobile computing devices of a first population of users and implement the foregoing methods and techniques and to record a test cumulative pixel exposure for each instance of the mobile ad served to mobile computing devices of this first population of users during a test period. The ad platform can then: access outcomes—of a particular outcome type (e.g., brand lift, conversion)—of consumption of these instances of the mobile ad across the first population of users; calculate a correlation (e.g., covariance) between cumulative pixel exposure and outcome of the particular outcome type for the mobile ad based on test cumulative pixel exposures and outcomes associated with the mobile ad and recorded during the test period; and define a threshold cumulative pixel exposure associated with a threshold probability of an outcome of the particular outcome type based on this correlation. More specifically, in this example, the ad platform can implement machine learning, artificial intelligence, a neural network, or other analysis techniques to calculate a probability of an outcome of the particular type as a function of cumulative pixel exposure based on cumulative pixel exposure and outcome data for this population of users. Based on a target probability of the outcome occurring as a result of viewing the mobile ad during an ad session (e.g., 50% probability of the outcome)—such as specified for the advertising campaign by an ad publisher—the ad platform can calculate a threshold cumulative pixel exposure predicted to yield this target probability of the outcome. When the mobile ad is subsequently served to a mobile computing device associated with a new user and a new cumulative pixel exposure thus calculated for this mobile ad viewed by the new user, the ad platform can record an impression for this mobile ad if the new cumulative pixel exposure exceeds the threshold cumulative pixel exposure, as shown in FIG. 4B; otherwise, the ad platform can mark the mobile ad as not viewed by the new user, since this new cumulative pixel exposure falls below the threshold cumulative pixel exposure correlated with the threshold probability of this outcome.

7.2 Mobile Ad Quality

The ad platform can also assess a quality of the mobile ad (e.g., a "visual accessibility" of content contained within the mobile ad) based on the threshold cumulative pixel exposure. For example, the ad platform, publisher, or advertising agency, etc. can quantify a visual accessibility of the mobile ad as an inverse function of the threshold cumulative pixel exposure. More specifically, a relatively high cumulative pixel exposure to achieve a certain degree of brand lift within a test population of users may indicate that a mobile ad is of low quality or that its content exhibits low visual accessibility; and vice versa. Therefore, the ad platform, a publisher, or an advertising agency, etc. may price the mobile advertising campaign, modify the mobile ad, discard the mobile ad, and/or launch the mobile advertising campaign based on this threshold cumulative pixel exposure.

7.2 Cumulative Pixel Exposure Target and Campaign Adjustment

In a similar variation shown in FIG. 1, the ad platform, publisher, or advertising agency, etc. can set a target average cumulative pixel exposure across a population of users over the course of a mobile advertising campaign based on the unique model of the mobile ad, a model of the mobile ad format, or a generic mobile ad model. For example, the publisher or advertising agency can specify a target brand lift across the population of users; and the ad platform can calculate a minimum average cumulative pixel exposure that will yield this specified target brand lift across this population based on the model.

In the foregoing example, once the mobile advertising campaign is initiated, the ad platform can automatically recalculate an actual average cumulative pixel exposure for the mobile ad across a population of users, such as on an hourly, daily, or weekly basis or per number of (e.g., 1000) instances of the mobile ad served. The ad platform can then automatically prompt adjustment of the mobile advertising campaign (e.g., modification of the mobile ad, transfer of ad content to a different mobile ad format, or cancellation of the mobile advertising campaign) if the actual average cumulative pixel exposure across the population of users is (significantly) less than the minimum average cumulative pixel exposure specified for the mobile advertising campaign.

7.2 Frequency Capping

As shown in FIGS. 1 and 4B, another variation of the method S100 includes Block S140, which recites, at a second time succeeding the first time, in response to the cumulative pixel exposure remaining below a threshold cumulative pixel exposure, re-serving the mobile ad to the mobile computing device in Block S140. Generally, in Block S140, the ad platform (or an ad exchange, ad publisher, advertising agency, or other CDN) can implement a rule based on cumulative pixel exposure to determine whether to serve an additional instance of a mobile ad or to serve a different mobile ad for a different brand or product to a particular mobile computing device (e.g., to a particular user).

In particular, because distribution of a mobile ad to a web browser executing on a mobile computing device may be a poor metric for consumption or awareness of the mobile ad by a user, as described above, assignment of a maximum number of instances that a mobile ad is served to a user may be insufficient to guarantee a target degree of brand lift for this user. Therefore, the ad platform can cap a number of instances of a mobile ad served to a user based on cumulative pixel exposure for the mobile ad at the mobile computing device, which may form a more accurate representation of the user's awareness and/or interest in the advertised brand or product.

In a similar example, the ad platform can: serve a first instance of the mobile ad to the user's mobile computing device for loading into a first advertisement slot within a first webpage opened within a web browser executing on the user's mobile computing device; and calculate a first cumulative pixel exposure characterizing the user's engagement with this first instance of the mobile ad. When the user later accesses a second webpage—including a second advertisement slot—at the mobile computing device, the ad platform can serve a second instance of the mobile ad to the mobile computing device for loading into the second advertisement slot within the second webpage if the first cumulative pixel exposure remains below a threshold cumulative pixel exposure. Subsequently, the second instance of the mobile ad and the ad platform can cooperate to execute Blocks S120, S122, S130, and S132 described above to calculate a second cumulative pixel exposure for the second instance of the mobile ad viewed at the mobile computing device. Later, in response to a sum of the cumulative pixel exposure and the second cumulative pixel exposure exceeding the threshold cumulative pixel exposure, the ad platform can serve a second mobile ad different from the mobile ad—such as in a different advertising campaign—to the mobile computing device (e.g., for loading into a third advertisement slot within a third webpage opened within the web browser executing on the mobile computing device).

In another example, the ad platform can set a target cumulative pixel exposure per individual user, such as 50% of a minimum average cumulative pixel exposure for a population of users. When a first instance of the mobile ad is served to a particular mobile computing device associated with a particular user, the ad platform can implement Blocks of the method S100 described above to calculate a first cumulative pixel exposure for the first instance of the mobile ad at the particular mobile computing device; if this first cumulative pixel exposure is less than the target cumulative pixel exposure per user, the ad platform can serve a second instance of the mobile ad to the particular mobile computing device when another webpage is loaded onto the particular mobile computing device at a later time, such as immediately or minutes or hours thereafter. The ad platform can calculate a second cumulative pixel exposure for the second instance of the mobile ad and then calculate a sum of the first and second cumulative pixel exposures. If this cumulative pixel exposure sum is still less than the target cumulative pixel exposure per user, the ad platform can serve a third instance of the mobile ad to the particular mobile computing device at a later time and repeat the foregoing process until the cumulative pixel exposure sum exceeds the target cumulative pixel exposures.

In the foregoing example, once the target cumulative pixel exposure has been surpassed, the ad platform can disable the mobile ad for a particular user since a target brand lift (or probability of long-term conversion) has been reached. Alternatively, once the target cumulative pixel exposure has been surpassed, the ad platform can: mark the user as "leveled-up": and switch to serving a different mobile ad containing deeper ad content related to the same brand or product to the particular mobile computing device in order to develop further brand recognition (or reinforce likelihood of long-term conversion) for the particular user.

7.4 Advertising Campaign Progression

In another implementation, the ad platform determines whether to serve a next mobile ad within an advertising campaign to a user based on the user's cumulative pixel exposure for consumption of a preceding mobile ad in the same advertising campaign. For example, the ad platform can: serve a first mobile ad—within a first advertising campaign—to a user's mobile computing device for loading into a first webpage accessed at the mobile computing device in Block S110; and then cooperate with the first mobile ad to calculate a first cumulative pixel exposure for the first mobile ad viewed at the mobile computing device in Block S130, as described above. If this first cumulative pixel exposure exceeds a threshold cumulative pixel exposure assigned to the first mobile ad or to the first advertising campaign, the ad platform can elect to serve a second mobile ad within the first advertising campaign to the mobile computing device for loading into a second webpage accessed at the mobile computing device at a later time. However, if the first cumulative pixel exposure remains below the threshold cumulative pixel exposure, the ad platform can instead elect to serve a third mobile ad within a second advertising campaign—different from the first advertising campaign—to the mobile computing device for loading into this second webpage later rendered by the user. Therefore, the ad platform can elect to continue serving a sequence of mobile ads within a particular advertising campaign to a user over time if the cumulative pixel exposure for this user viewing the last mobile ad in this sequence remains above a (corresponding) threshold cumulative pixel exposure; otherwise, the ad platform can elect a different advertising campaign for the user.

In the foregoing example, the ad platform can implement methods and techniques similar to those described above to calculate this threshold cumulative pixel exposure. For example, during a test period, the ad platform can: serve a set of instances of the mobile ad to mobile computing devices of a first population of users; record a test cumulative pixel exposure for each instance of the mobile ad served to mobile computing devices of the first population of users; access outcomes (e.g., brand lift, conversion) of consumption of the set of instances of the mobile ad across the first population of users; calculate a correlation between cumulative pixel exposure and outcome for the mobile ad based on test cumulative pixel exposures and outcomes associated with the mobile ad and recorded during the test period; and then define the threshold cumulative pixel exposure based on this correlation (e.g., a minimum cumulative pixel exposure that yields at least a threshold probability of the outcome, as described above). The ad platform can execute this process generally for all mobile ads in the advertising campaign or for each individual mobile ad in the advertising campaign.

Alternatively the ad platform can elect to continue serving a sequence of mobile ads within a particular advertising campaign to a user over time as long as the cumulative pixel exposure for the next mobile ad, in this advertising campaign, served to this user continues to increase over time.

However, the ad platform can implement any other method or technique to inform selection of a next mobile ad served to the user based on cumulative pixel exposures of previous mobile ads thus served to the user. The ad platform can also implement any other method or technique to define corresponding triggers or parameters for executing such ad selection decisions.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile computing device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method for quantifying user engagement comprising:
during a first time period, in response to selecting a first advertisement in a first advertising campaign for presentation within a first advertisement slot rendered by a first computing device accessed by a first user:
    accessing a first proportion of pixels of the first advertisement rendered on a first display of the first computing device during a first sampling period;
    accessing a second proportion of pixels of the first advertisement rendered on the first display during a second sampling period;
    calculating a first cumulative pixel exposure of the first advertisement at the first computing device during the first time period based on:
        a first product of the first proportion of pixels and a first duration of the first sampling period; and
        a second product of the second proportion of pixels and a second duration of the second sampling period; and
    accessing an outcome model associating cumulative pixel exposures of the first advertisement in the first advertising campaign and a first target outcome defined by the first advertising campaign;
    characterizing engagement of the first user consuming the first advertisement according to the first target outcome based on the outcome model and the first cumulative pixel exposure; and
    in response to engagement of the first user consuming the first advertisement exceeding a first threshold engagement, selecting a second advertisement within the first advertising campaign for presentation within a second advertisement slot rendered by the computing device; and
during a second time period, in response to selecting the first advertisement in the first advertising campaign for presentation within a third advertisement slot rendered by a second computing device accessed by a second user:
    accessing a third proportion of pixels of the first advertisement rendered on a second display of the second computing device during a third sampling period;
    accessing a fourth proportion of pixels of the first advertisement rendered on the second display during a fourth sampling period; and
    calculating a second cumulative pixel exposure of the first advertisement at the computing device during the second time period based on:
        a third product of the third proportion of pixels and a third duration of the third sampling period; and
        a fourth product of the fourth proportion of pixels and a fourth duration of the fourth sampling period; and
    characterizing engagement of the second user consuming the first advertisement according to the first target outcome based on the outcome model and the second cumulative pixel exposure; and
    in response to engagement of the second user consuming the first advertisement falling below the first threshold engagement, selecting a third advertisement within a second advertising campaign for presentation within a fourth advertisement slot rendered by the second computing device, the second advertising campaign distinct from the first advertising campaign and defining a second target outcome.

2. The method of claim 1:
further comprising, during the first time period:
    in response to engagement of the first user consuming the first advertisement falling below the first threshold engagement and exceeding a second threshold engagement, selecting a second instance of the first advertisement for presentation within the second advertisement slot; and
    in response to engagement of the first user consuming the first advertisement falling below the second threshold engagement, selecting a fourth advertisement within a second advertising campaign for presentation within the second advertisement slot, the second advertising campaign distinct from the first advertising campaign and defining a second target outcome; and
wherein selecting the third advertisement within the second advertising campaign for presentation within the fourth advertisement slot in response to engagement of the second user consuming the first advertisement falling below the first threshold engagement comprises:
    in response to engagement of the second user consuming the first advertisement falling below the first threshold engagement and exceeding the second threshold engagement, selecting a third instance of the first advertisement for presentation within the fourth advertisement slot; and
    in response to engagement of the second user consuming the first advertisement falling below the first threshold engagement and falling below the second threshold engagement, selecting the third advertisement within the second advertising campaign for presentation within the fourth advertisement slot.

3. The method of claim 2, further comprising, in response to selecting the second instance of the first advertisement for presentation within the second advertisement slot:
    recording a fifth proportion of pixels of the second instance of the first advertisement rendered on the first display during a fifth sampling period;
    recording a sixth proportion of pixels of the second instance of the first advertisement rendered on the first display during a sixth sampling period;
    calculating a third cumulative pixel exposure of the second instance of the first advertisement at the first computing device based on:
        a fifth product of the fifth proportion of pixels and a duration of the fifth sampling period; and
        a sixth product of the sixth proportion of pixels and a duration of the sixth sampling period;
    calculating a total cumulative pixel exposure of the first advertisement at the first computing device based on a sum of the first cumulative pixel exposure and the third cumulative pixel exposure;

characterizing engagement of the first user consuming the first advertisement according to the first target outcome based on the outcome model and the total cumulative pixel exposure; and in response to engagement of the first user consuming the first advertisement exceeding the first threshold engagement, selecting the fourth advertisement within the first advertising campaign for presentation within a fifth advertisement slot rendered by the first computing device.

4. The method of claim 1:
wherein accessing the first proportion of pixels in response to selecting the first advertisement for presentation within the first advertisement slot rendered by the first computing device comprises accessing the first proportion of pixels in response to selecting the first advertisement for presentation within the first advertisement slot located at a top of a webpage opened within a web browser executing on the first computing device; and
wherein selecting the second advertisement within the first advertising campaign for presentation within the second advertisement slot comprises selecting the second advertisement within the first advertising campaign for presentation within the second advertisement slot located at a bottom of the webpage.

5. The method of claim 1, further comprising, in response to engagement of the first user consuming the first advertisement exceeding the first threshold engagement, recording an impression for the first advertisement.

6. The method of claim 1, further comprising, during a test period preceding the first time period:
serving a set of instances of the first advertisement, in the first advertising campaign, to a set of computing devices associated with a test population of users;
for each instance of the first advertisement served to the set of computing devices:
recording a test proportion of pixels of the first advertisement rendered on a display of a corresponding computing device, in the set of computing devices, during a test sampling period within the test period;
calculating a test cumulative pixel exposure based on a product of the test proportion of pixels and a duration of the test sampling period; and
accessing an outcome of a particular outcome type of consumption of the first advertisement by a corresponding user, in the test population of users;
deriving the outcome model based on test cumulative pixel exposures and outcomes associated with the first advertisement across the test population of users; and
defining the first threshold engagement associated with a threshold probability of the first target outcome based on the outcome model.

7. The method of claim 6, wherein accessing the outcome of consumption of the first advertisement for each instance of the first advertisement served to the set of computing devices comprises accessing instances of conversion for a product associated with the first advertisement across the test population of users responsive to consumption of the first advertisement at the set of computing devices.

8. The method of claim 1:
wherein accessing the first proportion of pixels in response to selecting the first advertisement comprises accessing the first proportion of pixels in response to selecting the first advertisement comprising a video segment, the first proportion of pixels comprising a first proportion of pixel rows in a first frame of the video segment rendered on the first display during the first sampling period;
wherein accessing the second proportion of pixels comprises accessing the second proportion of pixel rows in a second frame of the video segment rendered on the first display during the second sampling period; and
wherein calculating the first cumulative pixel exposure comprises calculating the first cumulative pixel exposure representative of a proportion of a total area of frames in the video segment in the first advertisement rendered on the first display of the first computing device during a browse session.

9. The method of claim 1:
wherein accessing the first proportion of pixels of the first advertisement rendered on the first display during the first sampling period comprises accessing a first proportion of pixel rows of the first advertisement rendered within a viewport at the first computing device during the first sampling period in response to a portion of the first advertisement entering the viewport;
wherein accessing the second proportion of pixels of the first advertisement rendered on the first display during the second sampling period comprises accessing a second proportion of pixel rows of the first advertisement rendered within the viewport during the second sampling period;
wherein calculating the first cumulative pixel exposure of the first advertisement at the first computing device comprises summing the first proportion of pixel rows integrated over the first sampling period and the second proportion of pixel rows integrated over the second sampling period to calculate the first cumulative pixel exposure.

10. A method for quantifying user engagement comprising:
during a first time period, selecting a first advertisement, in a first advertising campaign defining a first target outcome, for presentation within a first advertisement slot rendered by computing device accessed by a user;
recording a first proportion of pixels of the first advertisement rendered on a display of the computing device during a first sampling period within the first time period;
recording a second proportion of pixels of the first advertisement rendered on the display of the computing device during a second sampling period succeeding the first sampling period and within the first time period;
calculating a cumulative pixel exposure of the first advertisement at the computing device based on:
a first product of the first proportion of pixels and a first duration of the first sampling period; and
a second product of the second proportion of pixels and a second duration of the second sampling period; and
during a second time period succeeding the first time period:
in response to the cumulative pixel exposure exceeding a first threshold cumulative pixel exposure, selecting a second advertisement within the first advertising campaign for presentation within a second advertisement slot rendered by the computing device;
in response to the cumulative pixel exposure remaining below the first threshold cumulative pixel exposure and exceeding a second threshold cumulative pixel exposure less than the first threshold cumulative pixel exposure, selecting a second instance of the first advertisement for presentation within the second advertisement slot; and in response to the cumulative pixel exposure remaining below the second threshold cumulative pixel exposure, selecting a third advertisement within a second advertising campaign, different distinct from the first advertising campaign and defining a second target outcome, for presentation within the second advertisement slot.

11. The method of claim 10:

wherein selecting the second instance of the first advertisement for presentation within the second advertisement slot comprises serving the second instance of the first advertisement to the computing device for presentation within the second advertisement slot; and further comprising, during a second time period, in response to serving the second instance of the first advertisement to the computing device:

recording a third proportion of pixels of the first advertisement rendered on the display of the computing device during a third sampling period within the first time period;

recording a fourth proportion of pixels of the first advertisement rendered on the display of the computing device during a fourth sampling period succeeding the third sampling period and within the second time period;

calculating the cumulative pixel exposure of the first advertisement at the computing device based on:

the first product of the first proportion of pixels and the first duration;

the second product of the second proportion of pixels and the second duration;

a third product of the third proportion of pixels and a third duration of the third sampling period; and a fourth product of the fourth proportion of pixels and a fourth duration of the fourth sampling period; and at a third time succeeding the second time period, in response to the cumulative pixel exposure of the first advertisement remaining below the first threshold cumulative pixel exposure, selecting the third advertisement within the second advertising campaign for presentation within a third advertisement slot rendered by the computing device.

12. The method of claim 10, further comprising, during a test period preceding the first time period and the second time period:

serving a set of instances of the first advertisement, in the first advertising campaign, to a set of computing devices associated with a test population of users;

for each instance of the first advertisement served to the set of computing devices:

recording a test proportion of pixels of the first advertisement rendered on a display of a corresponding computing device, in the set of computing devices, during a test sampling period within the test period;

calculating a test cumulative pixel exposure based on a product of the test proportion of pixels and a duration of the test sampling period; and accessing an outcome of a particular outcome type of consumption of the first advertisement by a corresponding user, in the test population of users;

deriving the model based on test cumulative pixel exposures and the outcomes associated with the first advertisement across the test population of users; and defining the threshold cumulative pixel exposure associated with a threshold probability of the first target outcome of the particular outcome type based on the outcome model.

13. The method of claim 10:

wherein selecting the first advertisement for presentation within the first advertisement slot rendered by the computing device comprises selecting the first advertisement for presentation within the first advertisement slot within a first webpage opened within a web browser executing on the computing device; and wherein selecting the second advertisement within the first advertising campaign for presentation within the second advertisement slot comprises selecting the second advertisement within the first advertising campaign for presentation within the second advertisement slot located within a second webpage opened within the web browser.

14. The method of claim 10:

wherein selecting the first advertisement comprises selecting the first advertisement comprising a set of cards arranged laterally within a visual element;

wherein recording the first proportion of pixels of the first digital advertisement rendered on the display during the first sampling period comprises recording the first proportion of pixel rows in a first card, in the set of cards, rendered on the display during the first sampling period;

wherein recording the second proportion of pixels of the first digital advertisement rendered on the display during the second sampling period comprises recording the second proportion of pixel rows in a second card, in the set of cards, rendered on the display during the second sampling period responsive to a lateral swipe event over the visual element at the computing device; and wherein calculating the cumulative pixel exposure comprises calculating the cumulative pixel exposure representative of a proportion of a total area of the set of cards displayed on the computing device during an advertising session.

15. A method comprising:

during a test period:

serving a set of instances of a first advertisement, in a first advertising campaign, to a set of computing devices associated with a test population of users;

for each instance of the first advertisement served to the set of computing devices:

recording a test proportion of pixels of the first advertisement rendered on a display of a corresponding computing device, in the set of computing devices, during a test sampling period within the test period;

calculating a test cumulative pixel exposure based on a product of the test proportion of pixels and a duration of the test sampling period; and accessing an outcome of a particular outcome type of consumption of the first advertisement by a corresponding user, in the test population of users;

deriving an outcome model associating test cumulative pixel exposures and outcomes of the particular outcome type for the first advertisement based on test cumulative pixel exposures and the set of outcomes associated with the first advertisement across the test population of users; and defining a threshold cumulative pixel exposure associated with a threshold probability of a target outcome of the particular outcome type based on the outcome model;

during a live period succeeding the test period:
- at a first time, serving the first advertisement in the first advertising campaign to a first computing device for presentation within a display of the first computing device;
- recording a first proportion of pixels of the first advertisement rendered on the display of the first computing device during a first sampling period within the live period;
- recording a second proportion of pixels of the first advertisement rendered on the display of the first computing device during a second sampling period succeeding the first sampling period and within the live period;
- calculating a cumulative pixel exposure of the first advertisement at the first computing device based on a combination of:
  - a first product of the first proportion of pixels and a duration of the first sampling period; and
  - a second product of the second proportion of pixels and a duration of the second sampling period; and
- in response to the cumulative pixel exposure of the first advertisement at the first computing device exceeding the threshold cumulative pixel exposure, recording an impression for the first advertisement.

16. The method of claim 15, further comprising, at a second time succeeding the first time:
- in response to the cumulative pixel exposure exceeding the threshold cumulative pixel exposure, serving a second digital advertisement within the first advertising campaign to the computing device for loading into a second webpage accessed at the computing device; and
- in response to the cumulative pixel exposure remaining below the threshold cumulative pixel exposure, serving a third digital advertisement within a second advertising campaign different from the first advertising campaign to the computing device for loading into the second webpage.

17. The method of claim 15:
wherein accessing the outcome of the particular outcome type of consumption of the first advertisement comprises accessing brand lift data within the test population of users following consumption of the first advertisement; and
wherein defining the threshold cumulative pixel exposure associated with the threshold probability of the target outcome comprises defining the threshold cumulative pixel exposure associated with a minimum brand lift responsive to consumption of the first advertisement.

18. The method of claim 15:
further comprising:
- accessing a spatial map defining a distribution of weights of visual content within the first advertisement;
- accessing a first weight defined by the spatial map for a first region of the first advertisement represented by the first proportion of pixels; and
- accessing a second weight defined by the spatial map for a second region of the first digital advertisement represented by the second proportion of pixels; and wherein calculating the cumulative pixel exposure of the first advertisement comprises calculating the cumulative pixel exposure of the first advertisement based on a combination of:
- the first product of the first proportion of pixels and the first duration of the first sampling period weighted according to the first weight; and
- the second product of the second proportion of pixels and the second duration of the second sampling period weighted according to the second weight.

19. The method of claim 18:
further comprising:
- recording a third proportion of pixels of the first advertisement rendered on the display of the computing device during a third sampling period succeeding the second sampling period within the first time period, the third proportion of pixels spanning a call to action within the first advertisement; and
- accessing a third weight defined by the spatial map for a third region of the first advertisement represented by the third proportion of pixels;

wherein recording the first proportion of pixels of the first advertisement rendered on the display of the computing device during the first sampling period comprises recording the first proportion of pixels spanning a background area within the first advertisement;

wherein recording the second proportion of pixels of the first advertisement rendered on the display of the computing device during the second sampling period comprises recording the second proportion of pixels spanning the background area and a segment of iconography within the first advertisement; and wherein calculating the cumulative pixel exposure of the first advertisement comprises calculating the cumulative pixel exposure of the first advertisement based on a sum of:
- the first product of the first proportion of pixels and the first duration of the first sampling period weighted according to the first weight;
- the second product of the second proportion of pixels and the second duration of the second sampling period weighted according to the second weight greater than the first weight; and
- a third product of the third proportion of pixels weighted according to the third weight greater than the second weight.

20. The method of claim 15, further comprising, during the live period:
- at a third time succeeding the second time, accessing a quantity of impressions recorded for the first advertisement; and
- in response to the quantity of impressions falling below a threshold quantity, discarding the first advertisement from the first advertising campaign.

* * * * *